(12) United States Patent
Thomas et al.

(10) Patent No.: US 6,483,662 B1
(45) Date of Patent: Nov. 19, 2002

(54) HIGH DENSITY MULTI-COIL MAGNETIC WRITE HEAD HAVING A REDUCED YOKE LENGTH AND SHORT FLUX RISE TIME

(75) Inventors: Mark Thomas, Hollister, CA (US); Billy W. Crue, Jr., San Jose, CA (US); Zhupei Shi, San Jose, CA (US); Sonny Tran, Milpitas, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/350,773

(22) Filed: Jul. 9, 1999

(51) Int. Cl.[7] ............................................. G11B 5/147
(52) U.S. Cl. ..................................................... 360/126
(58) Field of Search ................................ 360/126, 123, 360/125

(56) References Cited

U.S. PATENT DOCUMENTS

| | | | |
|---|---|---|---|
| 4,694,368 A | 9/1987 | Bischoff et al. ............ 360/126 |
| 4,841,402 A | 6/1989 | Imanaka et al. ............ 360/126 |
| 5,072,324 A | 12/1991 | Lin et al. ..................... 360/126 |
| 5,124,870 A | * 6/1992 | Toyoda ........................ 360/110 |
| 5,170,302 A | 12/1992 | Matsumoto .................. 360/123 |
| 5,559,653 A | 9/1996 | Shouji et al. ............... 360/126 |
| 5,570,251 A | 10/1996 | Shinoura et al. ............ 360/126 |
| 5,706,152 A | 1/1998 | Honjo et al. ................. 360/123 |
| 5,805,391 A | 9/1998 | Chang et al. ................ 360/113 |

* cited by examiner

*Primary Examiner*—George J. Letscher

(57) ABSTRACT

A magnetoresistive write element has a plurality of coils disposed between a first and second pole. A first coil having inner and outer contacts is provided on top of a layer of insulation on top of the first pole. A write gap material above the first coil separates the poles at a yoke tip region to form a write gap therebetween. Second and third coils wound in the form of a single bifilar coil are provided on top of the write gap material, each having an inner and an outer contact portion. Electrical connection between the inner contact of the first coil and the inner contact of the second coil is provided through a via in the write gap material. An insulation layer above the second and third coils provides separation from a fourth coil provided thereabove. The fourth coil also has inner and outer contact portions. The outer contact of the fourth coil electrically connects with the outer contact of the second coil through one of the vias in the second insulation layer separating the second and third coil from the fourth coil. Similarly, the inner contact of the fourth coil connects electrically with the inner contact of the third coil. An insulation layer is deposited on top of the fourth coil and the second pole is formed on top thereof such that the first and second poles make electrical connection with one another at back gap portion.

15 Claims, 7 Drawing Sheets

HIGH DENSITY MULTI-COIL MAGNETIC WRITE HEAD HAVING A REDUCED YOKE LENGTH AND SHORT FLUX RISE TIME

BACKGROUND OF THE INVENTION

This invention relates generally to magnetic disk data storage systems, and more particularly to magnetic write transducers and methods for making same.

Magnetic disk drives are used to store an retrieve data for digital electronic apparatus such as computers. In FIGS. 1A and 1B, a magnetic disk data storage system 10 of the prior art is illustrated which includes a sealed enclosure 12, a disk drive motor 14, a magnetic disk 16, supported for rotation by a drive spindle S1 of motor 14, an actuator 18 and an arm 20 attached to an actuator spindle S2 of actuator 18. A suspension 22 is coupled at one end to the arm 20 and at its other end to a read/write head or transducer 24. The transducer 24 (which will be described in greater detail with reference to FIG. 2A) typically includes an inductive write element with a sensor read element As the motor 14 rotates the magnetic disk 16, is indicated by the arrow R, an air bearing is formed under the transducer 24 causing it to lift slightly off the surface of the magnetic disk 16, or, as it is termed in the art, to "fly" above the magnetic disk 16. Alternatively, see transducers, known as "contact heads," ride on the disk surface. Various magnetic "tracks" of information can be written to and/or read from the magnetic disk 16 as the actuator 18 causes the transducer 24 to pivot in a short arc as indicated by the arrows P. The design and manufacture of magnetic disk data storage systems is well known to those skilled in the art.

FIG. 2A depicts a magnetic read/write head 24 including a substrate 25 above which a read element 26 and a write element 28 are disposed. Edges of the read element 26 and write element 28 also define an air bearing surface ABS, in a plane 29, which can be aligned to face the surface of a magnetic disk 16 (see FIGS. 1A and 1B). The read element 26 includes a first shield 30, an intermediate layer 32, which functions as a second shield, and a read sensor 34 that is located within a dielectric medium 35 between the first shield 30 and the second shield 32. The most common type of read sensor 34 used in the read/write head 24 is the magnetoresistive (AMR or GMR) sensor which is used to detect magnetic field signals from the magnetic medium through changing resistance in the read sensor.

The write element 28 is typically an inductive write element which includes the intermediate layer 32, which functions as a first pole, and a second pole 38 disposed above the first pole 32. The first pole 32 and the second pole 38 are attached to each other by a back-gap portion 40, with these three elements collectively forming a yoke 41. The combination of a first pole tip portion 43 and a second pole tip portion 45 near the ADS are sometimes referred to as the yoke tip portion 46. A write gap 36 is formed between the first and second poles 32, 38 in the yoke tip portion 46. The write gap 36 is filled with a non-magnetic electrically insulating material that forms a write gap material layer 37. This non-magnetic material can be either integral with (as is shown here) or separate from a first insulation layer 47 that lies below the second pole 38 and extends from the yoke tip portion 46 to the back-gap portion 40.

Also included in write element 28 is a conductive coil 48, formed of multiple winds 49 which each have a wind height Hw. The coil 48 can be characterized by a dimension sometimes referred to as the wind pitch P, which is the distance from one coil wind front edge to the next coil wind front edge, as shown in FIG. 2A. As is shown, the wind pitch P is defined by the sum of the wind thickness Tw and the separation between adjacent winds Sw. The conductive coil 48 is positioned within a coil insulation layer 50 that lies above the first insulation layer 47. The first insulation layer 47 thereby electrically insulates the coil layer from the first pole 32, while the coil insulation layer 50 electrically insulates the winds 49 from each other and from the second pole 38.

The configuration of the conductive coil 48 can be better understood with reference to a plan view of the read/write head 24 shown in FIG. 2B taken along line 2B—2B of FIG. 2A. Because the conductive coil extends beyond the first and second poles, insulation may be needed beneath, as well as above, the conductive coil to electrically insulate the conductive coil from other structures. For example, as shown in FIG. 2C, a view taken along line 2C—2C of FIG. 2A, a buildup insulation layer 52 can be formed adjacent to the first pole, and under the conductive coil layer 48. As is well known to those skilled in the art, these elements operate to magnetically write data on a magnetic medium such as a magnetic disk 16 (see FIGS. 1A and 1B).

More specifically, an inductive write head such as that shown in FIGS. 2A–2C operates by passing a writing current through the conductive coil layer 48. Because of the magnetic properties of the yoke 41, a magnetic flux is induced in the first and second poles 32, 38 by write currents passed through the coil layer 48. The write gap 36 allows the magnetic flux to fringe out from the yoke 41 (thus forming a fringing gap field) and to cross a magnetic recording medium that is placed near the ABS. A critical parameter of a magnetic write element is the flux rise time. As will be appreciated by those skilled in the art, a reduction of flux rise time allows for increased recording speed. It has been found that a reduced flux rise time can be achieved by shortening the yoke length YL as referred to in FIG. 2D. Thus, to obtain faster recording speeds, and therefore higher data transfer rates, it may be desirable to have a shorter yoke length YL. This relationship can be seen in the graph of yoke length YL versus flux rise time shown in FIG. 2D.

Another parameter of the write element is the number of winds 49 in the coil layer 48, which determines magnetic motive for (MMF) of a write element. With increasing number of winds 49 between the fly and second poles 32, 38, the fringing field is stronger and, thus, the write performance increases. However the number of winds is limited by the yoke length YL, shown in FIG. 2A, and the pitch P between adjacent winds 49. Therefore, to maximize the number of coil winds while maintaining fast write speeds, it is desirable to minimize the pitch P in design of write elements. The minimum pitch is, however, limited by practical considerations such as manufacturing, and cost.

One method which has been used to increase the number of winds while maintaining a small yoke length has been to use multiple coils stacked one on top of another. However, prior art multiple coil write heads have required the use of a center tap to interconnect the coils, leading to increased manufacturing cost and increased stack height. Thus there remains a need for a write head which can provide a relatively large number of windings in a yoke having a short yoke length and without use of a center tap. Such a device would preferably be relatively inexpensive to construct and have a small stack height.

SUMMARY OF THE INVENTION

The present invention provides a magnetic write element and method for making the same that delivers a high magnetic motive force while also providing a short flux rise time. The invention accomplishes this by using multiple coils stacked one on top of the other including the use of a bifilar coil. The multiple coils are interconnected without using a center tap by connecting the coils through vias which traverse no more than one layer of insulation at a time. In other words each coil is connected only to a coil which is adjacent to it. Thus, saving significant manufacturing cost as well as minimizing the stack height of the write head.

The write head is constructed as a combination read/write head built upon a ceramic substrate. The write element of the read/write head includes a first pole constructed of a magnetic material. A first insulating material is deposited on the first pole and a first coil having inner and outer contacts is plated onto the first insulating layer. A write gap material is provided on top of the first coil including a via through which electrical contact can be made with the first coil. A second and third coil are then formed on top of the write gap material each having an inner and an outer contact, and formed as a single bifilar coil. The inner contact of the second coil makes electrical connection with the inner contact of the first coil through the via in the write gap material.

A second insulation layer is provided on top of the second and third coils and, like the first insulation layer is provided with vias through which electrical contact can be made. A fourth coil having an inner and an outer contact is provided on top of the second insulation layer. The outer contact of the fourth coil makes electrical connection with the outer contact of the second coil through one of the vias formed in the second insulation layer, and the inner contact of the fourth coil makes electrical connection with the inner connection of the third coil.

A third insulation layer is then provided on top of the fourth coil over which is formed a second pole. The second pole connects magnetically with the first pole at a back gap portion. An electrical signal can be supplied to the coil assembly through the outer contact of the first coil and the outer contact of the third coil. It will be appreciated by those skilled in the art that the described write element provides a multiple coil assembly without the need for a center tap and while only connecting coils which are adjacent with one another, thereby providing a write element having a short yoke length, high magnetic motive force and relatively short stack height. Furthermore, these improvements are realized in a device which is relatively inexpensive to manufacture.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

Figure 1A:
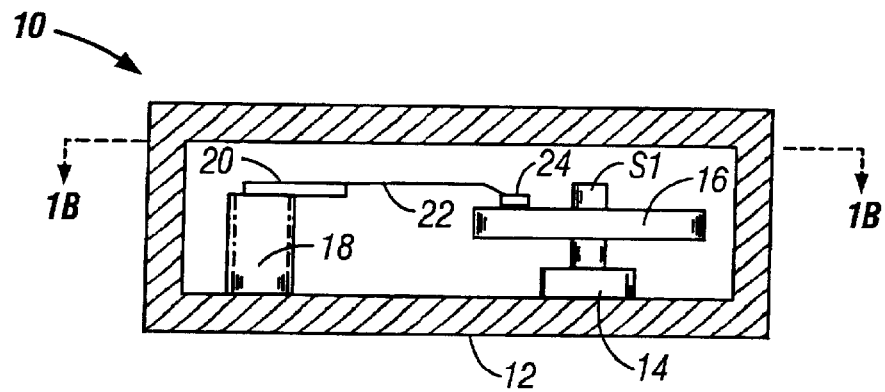
FIG. 1A is a partly sectional front elevation view of a magnetic data storage system.
Figure 1B:
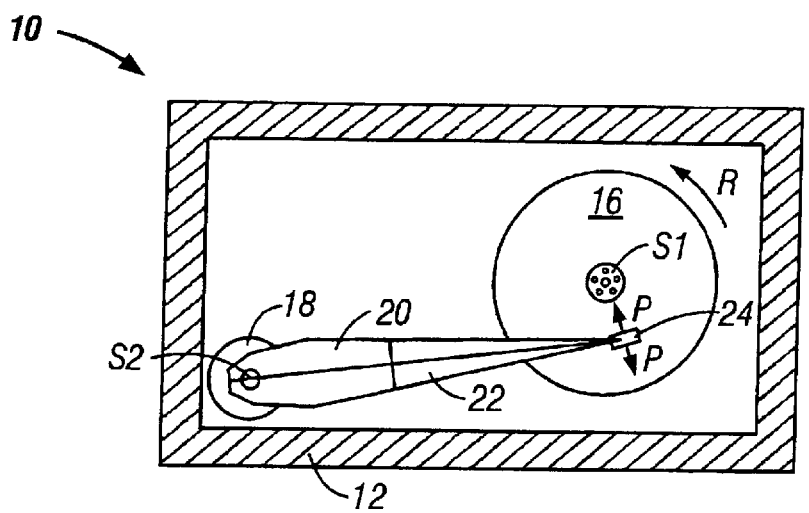
FIG. 1B is a top plan view taken along line 1B—1B of FIG. 1A.
Figure 2D:
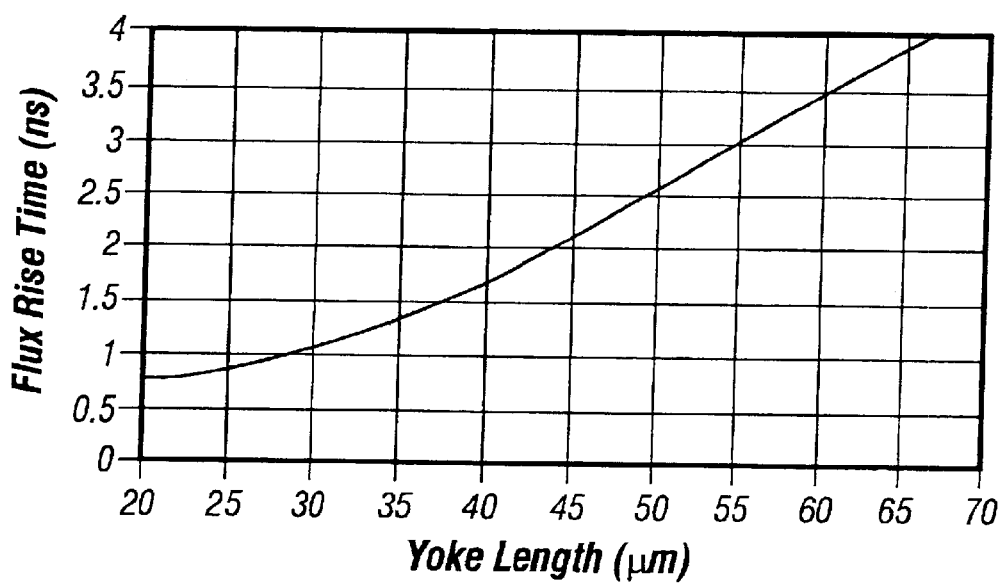
FIG. 2D is a representative graph of the relationship between yoke length and flux rise time.
Figure 2A:
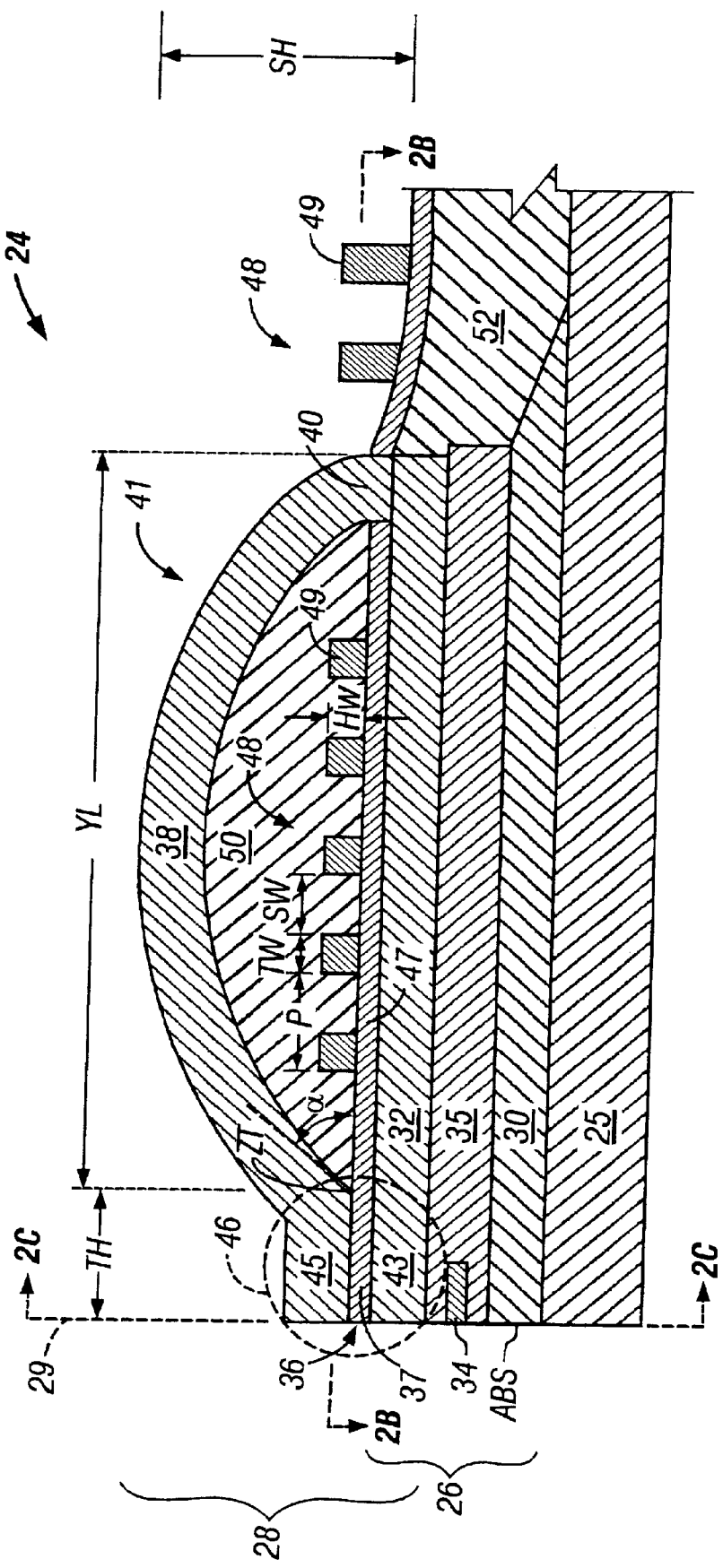
FIG. 2A is a sectional view of a prior art read/write head of the magnetic disk drive assembly of FIGS. 1A and 1B.
Figure 2B:
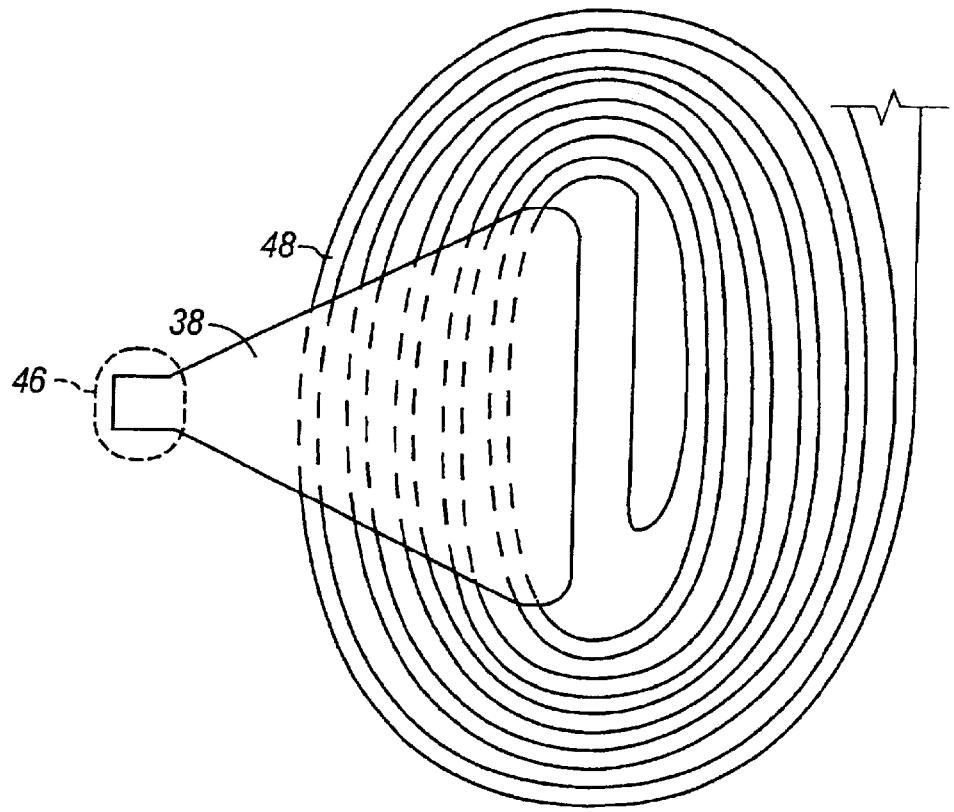
FIG. 2B is a plan view taken along line 2B—2B of FIG. 2A.
Figure 2C:
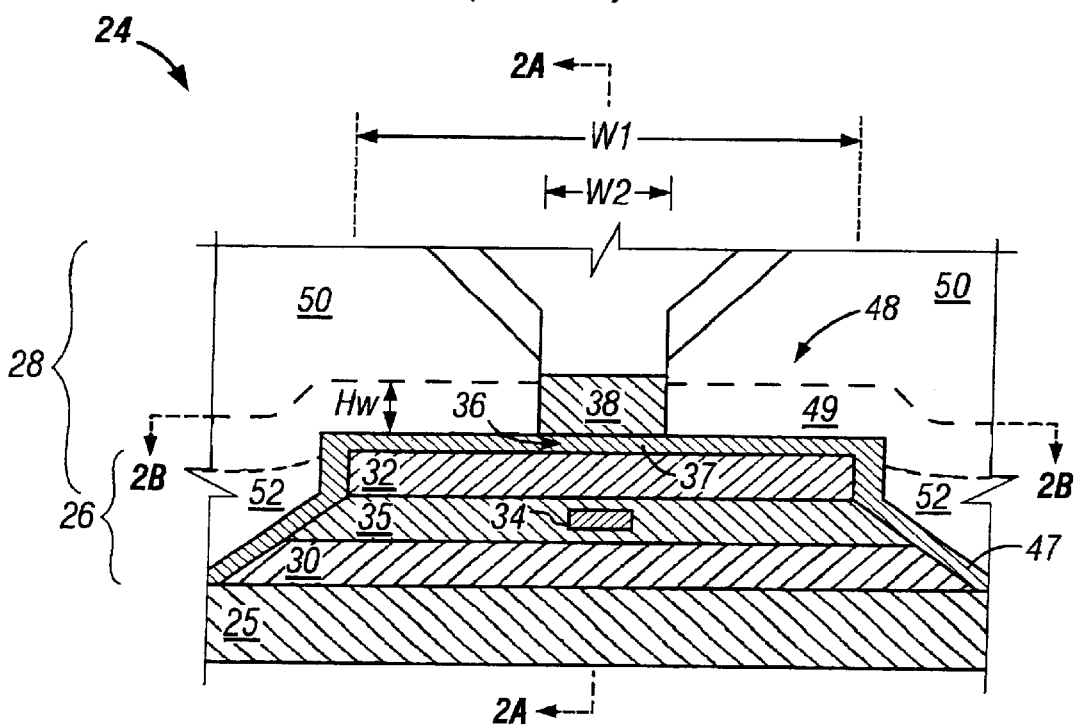
FIG. 2C is an ABS view taken along line 2C—2C of FIG. 2A.
Figure 3:
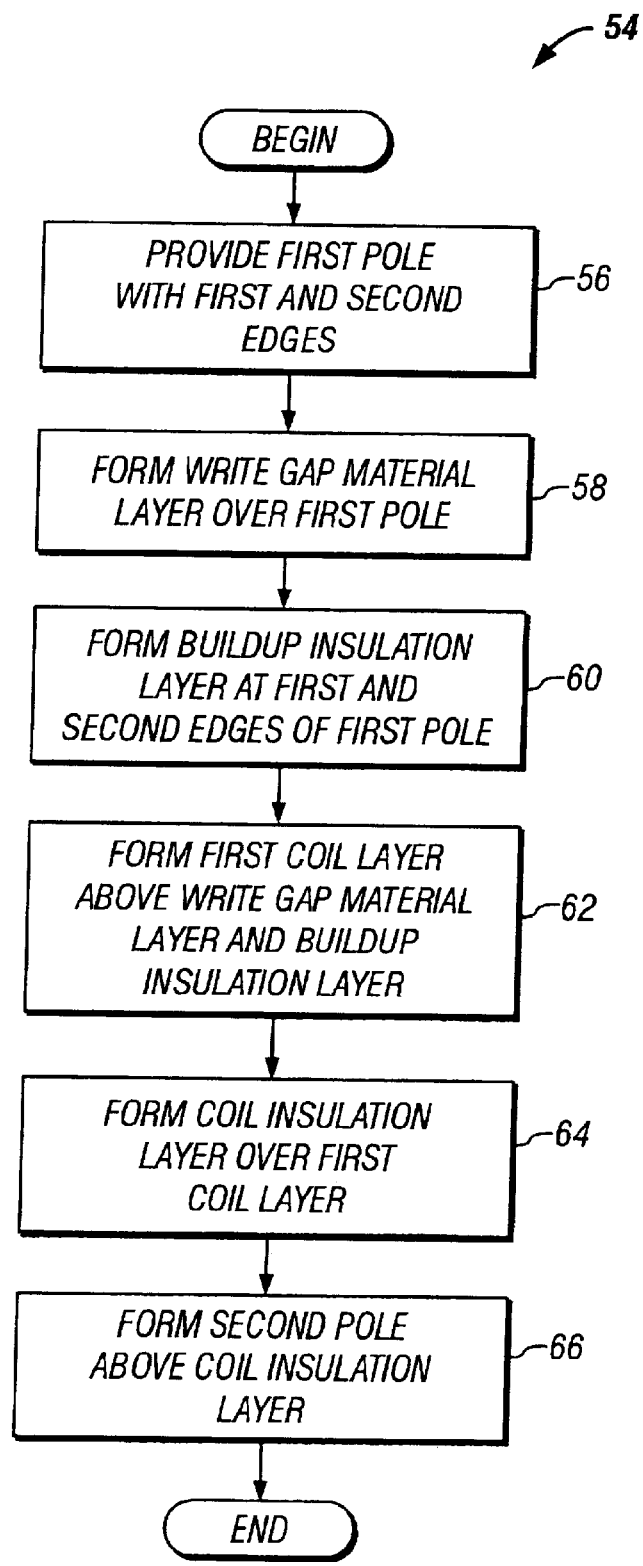
FIG. 3 is a process diagram of a method for forming a write element of the prior art.
Figure 4:
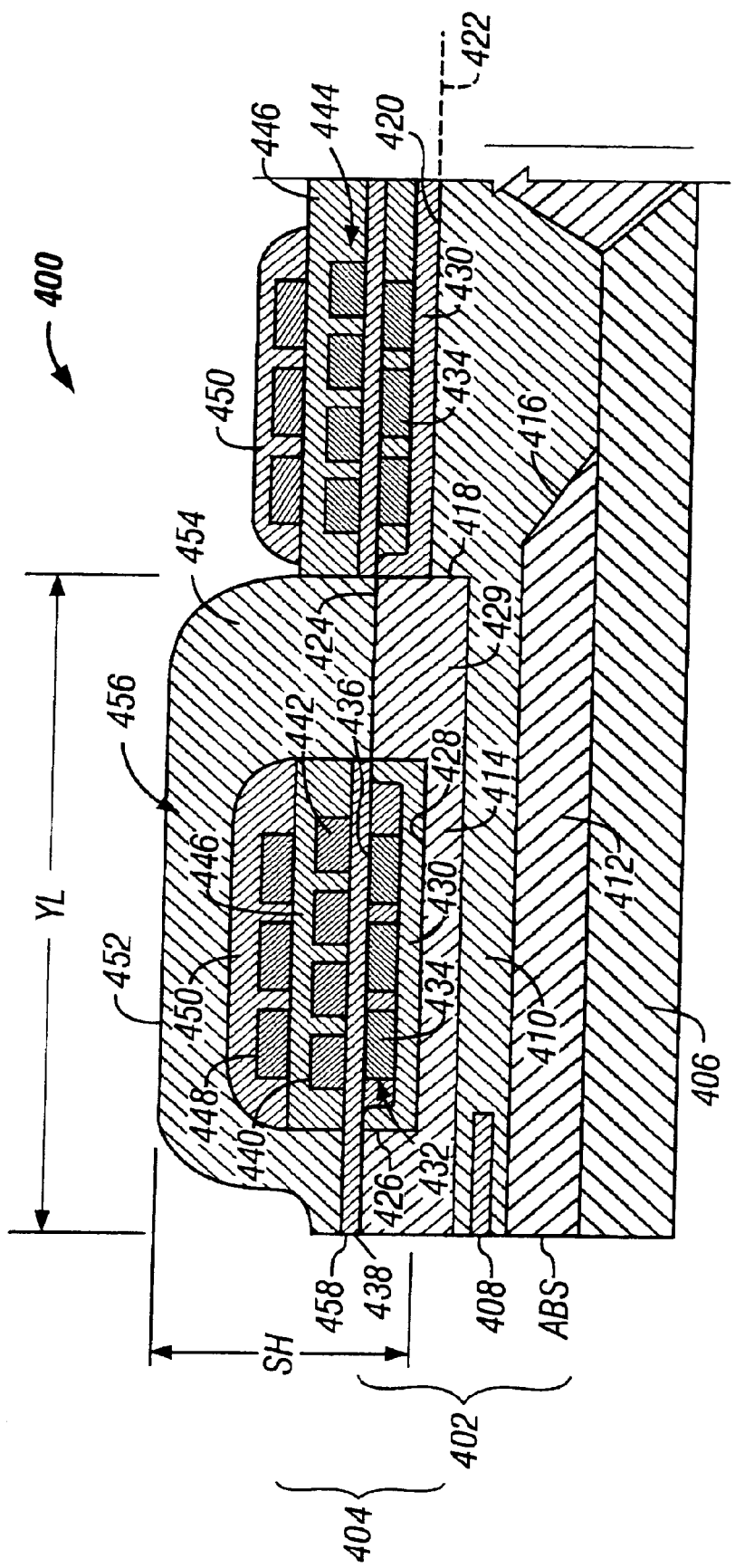
FIG. 4 is a sectional view of a write element according to an embodiment of the present invention.

With reference to FIG. 4, the present invention provides a magnetic read/write head, generally referred to as 400, having multiple coils providing a magnetic flux for imparting a signal onto a magnetic recording medium. The read/write head 400 includes a read element 402 and a write element 404 disposed above a substrate 406. As with the prior art, the read element 402 of the read/write head 400 includes a read sensor 408 in a dielectric medium 410 that is disposed between first and second shields 412 and 414 respectively. The dielectric medium 410 extends beyond a back surface 416 of the first shield 412 and a back surface 418 of the second shield 414, forming an upper surface 420 at a plane 422.

With continued reference to FIG. 4, the shield 414 of the read element 402 also functions as a first pole 414 of the write element 404. The first pole 414 has a generally planar top surface 424 having a channel 426, the bottom surface 428 of which extends to the level of the plane 422. The back end of the first pole terminates at a first back gap portion 429. A first insulation layer 430 is deposited onto the bottom surface 428 of the channel 426 and also onto the top surface 420 of the dielectric medium 410. The first insulation layer extends to a height below the top surface 424 of the first pole 414.

With further reference to FIG. 4 a first coil 432 is applied onto the first insulation layer 430. The coil 432 includes multiple coil winds 434. The first coil 432 has an upper surface 436 which is generally coplanar with the top surface 424 of the first pole 414. The coil can be constructed of any suitable electrically conducting material such as copper.

A write gap material 438 is disposed on top of the first coil 434 and the first pole 414 and can be formed of any suitable non-magnetic electrically insulating material, such as alumina. In this sense the write gap material 438 serves as a second insulation layer. The write gap material 438 is discontinuous at the back gap portion 429 of the first pole 414 for reasons which will be made clear, and covers the entire first coil, 434 including portions which are not on top of the first pole 414.

Figure 5:
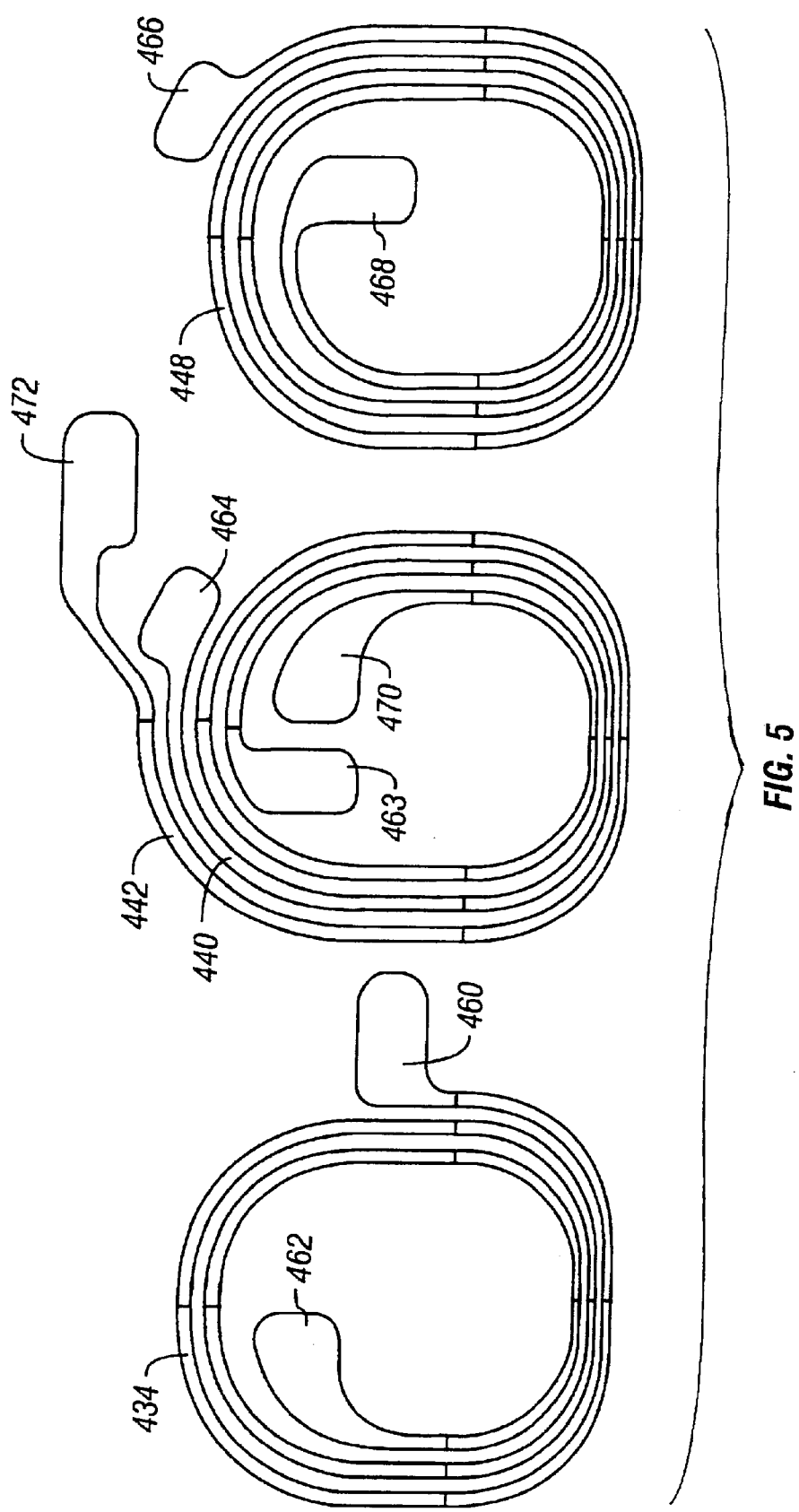
FIG. 5 is a plan view of individual coils of an embodiment of the present invention.

On top of the write gap material layer 438 are deposited second and third coils 440 and 442 respectively. With reference to FIG. 5, the second and third coils, while being separate coils, are coplanar and concentric in the form of a single bifilar coil 444. Arranging the second and third coils as a single bifilar coil increases the electro motive force while minimizing the required stack height SH. The write gap material 438 electrically insulates the first coil from the second and third coils. In addition, the second and third coils 440 and 442 are covered with a third insulation layer 446 which, in addition to covering the second and third coils, flows between them to electrically insulate them from one another.

With continued reference to FIG. 4, a fourth coil 448 is deposited on top of the third insulation layer 446, and a fourth insulation layer 450 is deposited on top of the fourth coil.

A second pole 452 is then provided on top of the fourth insulation layer 450. The back of the second pole terminates in a second back gap portion 454 which contacts the first back gap portion 429 of the first pole 414. The first and second poles 414 and 452 respectively join to form a yoke generally referred to as 456. Distal from the second back gap portion 454, at the front end of the read/write head 400, the second pole 452 sits atop the write gap material 438 so that the write gap material 438 is sandwiched between the first and second poles 414 and 452 respectively. This front portion of the write gap material 438, which is sandwiched between the first and second poles 414 and 452, defines a write gap 458. The front most surface of the read/write head is planar and forms an air bearing surface (ABS).

With reference now to FIG. 5., the connection of the various coils will now be described. FIG. 5 illustrates the coils as disassembled and lain side by side in order to more clearly show their individual geometries. The first coil 434 terminates in a first contact 460 at its outer end and a second contact 462 at its inner end. The second coil 440 terminates at its inner end in a first contact 463 and at its outer end in a second contact 464. The fourth coil terminates in a first contact 466 at its outer end and terminates in a second contact 468 at its inner end. The third coil 442 terminates in a first contact 470 at its inner end and in a second contact 472 at its outer end.

With continued reference to FIG. 5, as installed within the read/write head 400, the second terminal 462 of the first coil 434 is in electrical contact with the first contact 463 of the second coil. Electrical connection is achieved by a conducting material extending through a via, not shown, provided in the write gap material 438, a via being a cavity through which a material can be deposited. In a similar manner the second contact 464 of the second coil is electrically connected to the first contact 466 of the fourth coil. Electrical connection is achieved by a conducting material deposited through the third insulation layer 446. The second contact 468 of the fourth coil similarly in electrical connection with the first contact 463 of the third coil 442. Again electrical connection is achieved by an electrical conductor in a via through the third insulation layer 446.

This leaves the first contact 460 of the first coil, and the second contact 472 of the third coil unconnected. These contacts 460 and 472 can then be electrically connected to a source of electrical current external to the read/write head in order to induce an electrical current in the coils as connected. As will be appreciated, a current flowing through the coils they are connected will move in the same direction, clockwise or counterclockwise, simultaneously for all of the coils.

Figure 6:
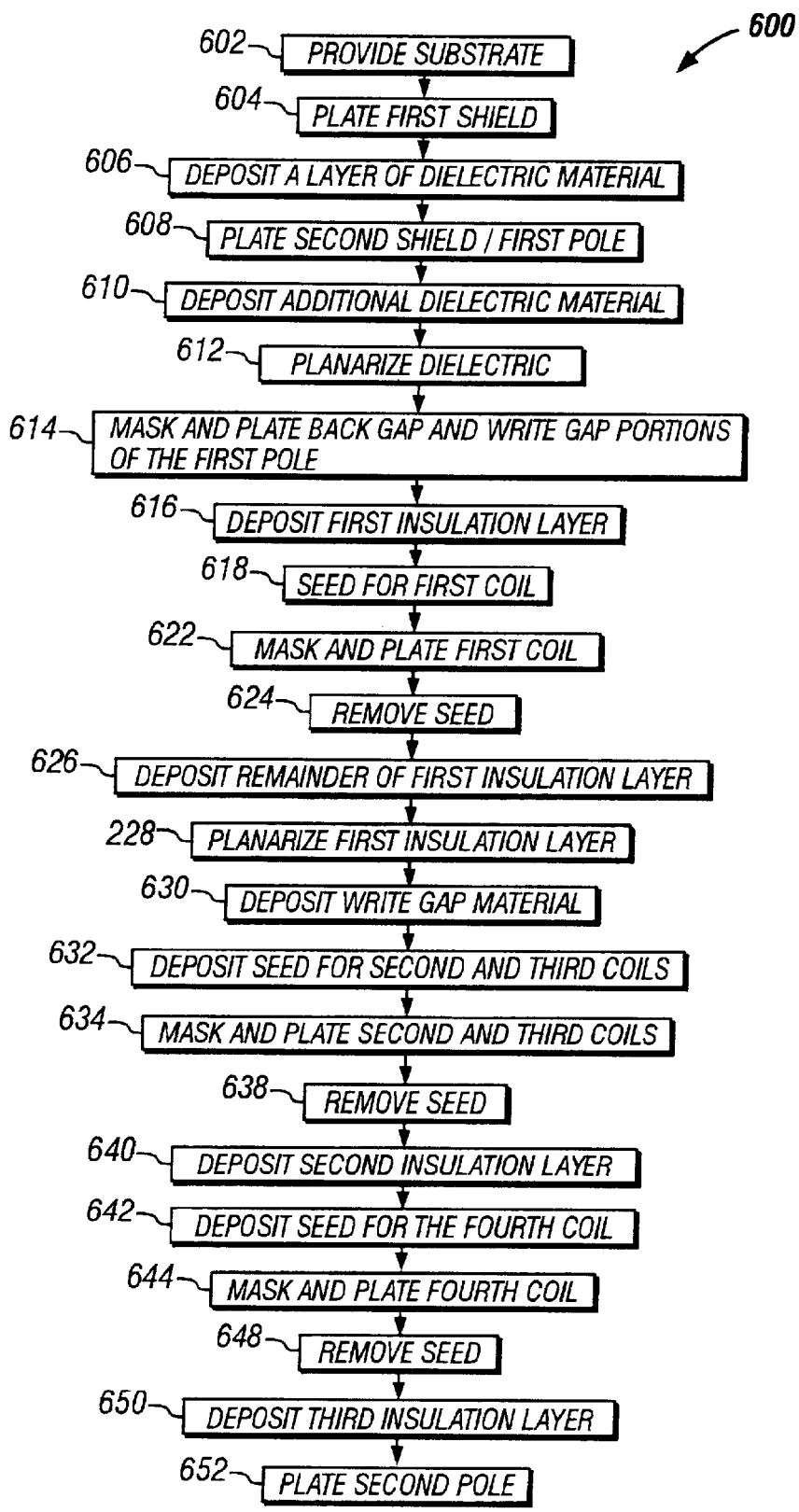
FIG. 6 is a process diagram of a method for forming a write element according to an embodiment of the present invention.

FIG. 6 illustrates a process for 600 for constructing the read/write head 400 of the present invention. The process begins with a step 602 of providing the substrate 406, on which the read/write element 400 will be built. Then a first shield 412 is plated onto the substrate in a step 604. A layer of the dielectric medium 410 is then deposited onto the shield and the substrate in a step 606. The dielectric layer can be formed of any suitable material such as alumina. The step 606 includes insertion of the read element 408 into the dielectric medium 410. The second shield/first pole 414 is then provided in a step 608 on top of the dielectric medium deposited step 606. In a step 610 the dielectric medium is further deposited so as to cover the first pole 414. The dielectric layer is then planarized in a step 612, exposing the first pole 414 and defining plane 422. The planarizing step can be accomplished by a suitable technique such as chemical-mechanical polishing (CMP), with substantially no critical tolerances. Such a process can be quicker and less expensive than other prior art methods employed to yield higher performance write elements, such as focused ion beam (FIB). The first pole 414 is further formed in a masking and plating step 614 to increase the thickness of back gap 429 and write gap portions of the first pole 414 while leaving the recess 426. The process continues with a step of back filling an insulation layer 616 onto the read/write head as it is has been formed to this point. Next, the insulation layer is seeded in a step 618 with a material such as copper or copper titanium which will allow the first coil 432 to adhere to the insulation layer 430. The first coil may then be constructed by a masking and plating step 622 followed by removing the seed material in a step 624. Another insulation depositing step 626 fills in the remainder of the first insulation layer 430 by depositing insulation between the windings 434 of the first coil 432. The first insulation layer 430 is then planarized by a CMP or other suitable process in a step 628, exposing the tops surface 436 of the first coil 432. The write gap material 438 can then be deposited in a step 630, being sure not to cover the back gap 429 and leaving vias at the locations of contacts 460 and 462 of the first coil 434, which can be accomplished by masking the back gap and contacts.

The second and third coils can be formed in a manner similar to that described above. A seed material is deposited on the write gap material in a step 632 prior to masking and plating the second and third coils in step 634. When depositing the second and third coils, it will be appreciated that conductive material can be deposited into the via formed in step 630 to electrically connect the contact 462 of the first coil 434 with contact 463 of the second coil 440. The seed material is then removed in a step 638, and the second insulation layer deposited in a step 640. When depositing the second insulation layers vias can be provided at the location of contact 464 of the second coil and at contacts 470 and 472 of the third coil. In addition, the second insulation layer should not cover the back gap portion 426 of the first pole 414 for reasons which will become apparent.

The second insulation layer can then be seeded with copper or copper titanium in a step 642 in preparation for depositing the fourth coil 448. Once this seed layer has been applied, the fourth coil can be masked and plated onto the seed layer in a steps 644 and the seed layer removed in a step 648. It will be appreciated that as the fourth coil is being plated, conducting material will enter the vias provided in the second insulation layer so that contact 466 of the fourth coil will electrically connect with contact 464 of the second coil and contact 468 of the fourth coil will electrically contact with contact 470 of the third coil.

With the fourth coil 448 in place a third insulation layer can be applied in a step 650 being sure to leave an opening for the back gap portion 454 of the second pole 452. The second pole 452 including the back gap portion 454 can then be plated onto the top of the read/write head in a step 652. Since the first second and third insulation layers 430, 446 and 450 respectively, as well as the write gap material 438 have been constructed so as not to cover the back gap portion 429 of the first pole 414, the back gap portions 429 and 454 of the first and second poles respectively can make magnetic contact.

In summary, because of the layout of the coils all coils can be in electrical connection to impart a simultaneous magnetic motive force without the need for a center tap as would be required using prior art methods, thus allowing for more efficient and less expensive manufacture of the read/write head. The invention has been described herein in terms of a preferred embodiment. Other embodiments of the invention, including alternatives, modifications, permutations and equivalents of the embodiments described herein, will be apparent to those skilled in the art from consideration of the specification, study of the drawings, and practice of the invention. For example, the above described write element can be incorporated with all of the coils being disposed above the write gap material. In addition, it would be possible to increase the number of coils or use more than one bifilar coil while still practicing the interconnection of coils of the present invention. The preferred embodiment described above should be considered exemplary, with the invention being defined by the appended claims, which therefore include all such alternatives, modifications, permutations and equivalents as fall within the true spirit and scope of the present invention.

We claim:

1. A thin film magnetic write head having a short yoke length and a high magnetic motive force, the write head comprising:
    a magnetic first pole having a top surface, and a back end adjacent thereto;
    a first insulating layer deposited on said top surface of said first pole;
    a first coil, deposited on top of said insulating layer, said first coil having at its periphery a first contact and having at its center a second contact;
    a second insulating layer formed on top of said first coil;
    a second coil, having at its center a first contact, and having at its periphery a second contact;
    said second contact of said first coil and said first contact of said second coil being in electrical contact through said second insulating layer;
    a third coil, coplanar and concentric with said second coil, having at its periphery a first contact and having at its center a second contact;
    a third insulating layer, formed on top of said second and third coils;
    a fourth coil, formed on top of said third insulating layer, having at its periphery a first contact and at its center a second contact;
    said second contact of said second coil being in electrical contact with said first contact of said fourth coil through said third insulation layer;
    said second contact of said fourth coil being in electrical contact with said second contact of said third coil through said third insulating layer;
    a fourth insulating layer formed on top of said fourth coil; and
    a magnetic second pole formed on top of said fourth insulating layer, said second pole having a back end in magnetic contact with said back end of said fist pole, and said first and second poles defining therebetween a write gap distal from said back ends.

2. A thin film magnetic write head as recited in claim 1, further comprising a write gap material filling said write gap.

3. A thin film magnetic write head as recited in claim 2 wherein said write gap material extends into said yoke between said first coil and said fist pole.

4. A thin film magnetic write head as recited in claim 2 wherein said write gap material extends into said yoke.

5. A thin film magnetic write head as recited in claim 1 wherein said first and second poles form a yoke between said write gap and said back end.

6. A thin film magnetic write head as recited in claim 1 wherein said back ends of said first and second poles make magnetic contact with one another through the centers of the coils.

7. A thin film magnetic write head as recited in claim 1 wherein said second and third coils are located between said first and fourth coils.

8. A thin film magnetic write head as recited in claim 7 wherein said second and third coils together form a bifilar coil.

9. A thin film magnetic write head having a short yoke length and a high magnetic motive force, the write head comprising:
    a first pole having a proximal end and a distal end;
    a second pole having a proximal end and a distal end, said distal end of said second pole in magnetic contact with said distal end of said first pole, said first and second poles defining a yoke;
    a first coil disposed partially within said yoke, having an outer end and an inner end, said first coil being in electrical isolation exclusive of said ends;
    a second coil disposed partially within said yoke, having an outer end and an inner end, said second coil being in electrical isolation exclusive of its ends;
    said inner end of said second coil being electrically connected with said inner end of said first coil;
    a third coil, disposed partially within said yoke and coplanar with said first coil, said third coil having an outer end and an inner end, said third coil by in electrical isolation exclusive of its ends;
    a fourth coil disposed partially within said yoke, having an outer end and an inner end, said forth coil being in electrical isolation exclusive of its ends;
    said outer end of said second coil being in electrical contact with said outer end of said fourth coil; and
    said inner end of said fourth coil being in electrical contact with said inner end of said third coil.

10. A thin film magnetic write head as recited in claim 9, further comprising an insulator within said yoke separating said coils from said poles.

11. A thin film magnetic write head as recited in claim 10 wherein said insulating material further separates the coils from one another.

12. A thin film magnetic write head as recited in claim 9 wherein said proximal ends of said poles are separated by a predetermined distance.

13. A thin film magnetic write head as recited in claim 12 wherein said predetermined distance defines a write gap.

14. A thin film magnetic write head as recited in claim 9 wherein said second and third coils together form a bifilar coil.

15. A thin film magnetic write head, comprising:
    a magnetic first pole having a top surface and front and back ends;
    a first insulating layer on the top surface of the first pole;
    a first coil on the first insulating layer, the first coil having an inner contact and an outer contact;
    a second insulating layer over the first coil;
    a bifilar coil over the second insulating layer, the bifilar coil comprising a second coil coplanar with and concentric with a third coil, the second and the third coil each having an inner contact and an outer contact;

a third insulating layer over the bifilar coil;

a fourth coil on the third insulating layer, having an inner contact and an outer contact;

the inner contact of the first coil being in electrical contact with the inner contact of the second coil through the second insulating layer;

the outer contact of the second coil being in electrical contact with the outer contact of the fourth coil through the third insulation layer, the inner contact of the fourth coil being in electrical contact with the inner contact of the third coil through the third insulation layer;

a fourth insulator over the fourth coil; and a magnetic second pole over the fourth insulating layer, the second pole having a front end and a back end, the back end of the second pole being in magnetic contact with the back end of the first pole, the second pole and the first pole together comprising a yoke.

* * * * *

UNITED STATES PATENT AND TRADEMARK OFFICE
CERTIFICATE OF CORRECTION

PATENT NO. : 6,483,662 B1
DATED : November 19, 2002
INVENTOR(S) : Mark Thomas et al.

It is certified that error appears in the above-identified patent and that said Letters Patent is hereby corrected as shown below:

Title page,
Item [75], Inventors, replace "Billy W. Crue, Jr., San Jose, CA (US)" with
-- Billy W. Crue, Jr., Pittsburgh, PA (US) --

Column 1,
Line 21, replace "element As" with -- element. As --
Line 26, replace "see" with -- some --

Column 2,
Line 44, replace "fly" with -- first --

Column 7,
Lines 58 and 65, replace "fist" with -- first --

Column 8,
Line 35, replace "by" with -- being --

Signed and Sealed this

Thirteenth Day of May, 2003

JAMES E. ROGAN
*Director of the United States Patent and Trademark Office*